United States Patent [19]

King et al.

[11] 4,212,666

[45] Jul. 15, 1980

[54] TIN RECOVERY

[75] Inventors: Edwin B. King, Dickinson; Wilson R. Barnes; Luis W. Pommier, both of Seabrook, all of Tex.

[73] Assignee: Associated Metals & Minerals Corporation, New York, N.Y.

[21] Appl. No.: 960,087

[22] Filed: Nov. 13, 1978

[51] Int. Cl.² .............................................. C22B 25/00
[52] U.S. Cl. ........................................... 75/85; 75/24; 75/113; 423/94; 423/96; 423/618
[58] Field of Search ................ 75/24, 85, 113; 423/94, 423/96, 618

[56] References Cited

U.S. PATENT DOCUMENTS 1,817,865  8/1931  Ashcroft .................................. 75/85

FOREIGN PATENT DOCUMENTS 907865   8/1972  Canada .
940712   1/1974  Canada .
1095122 12/1967  United Kingdom .
1337270 11/1973  United Kingdom .

Primary Examiner—M. J. Andrews
Attorney, Agent, or Firm—Christie, Parker & Hale

[57] ABSTRACT

Tin is recovered from a molten tin-bearing silicate slag by stirring the molten slag in the presence of calcium chloride and a carbonaceous material. The tin in the slag is rapidly converted to a volatile tin chloride compound, which is removed and contacted with a hot calcium chloride solution trickling over a bed of limestone rock to precipitate tin oxide, which is separated from the calcium chloride solution, which may be reused.

17 Claims, 1 Drawing Figure

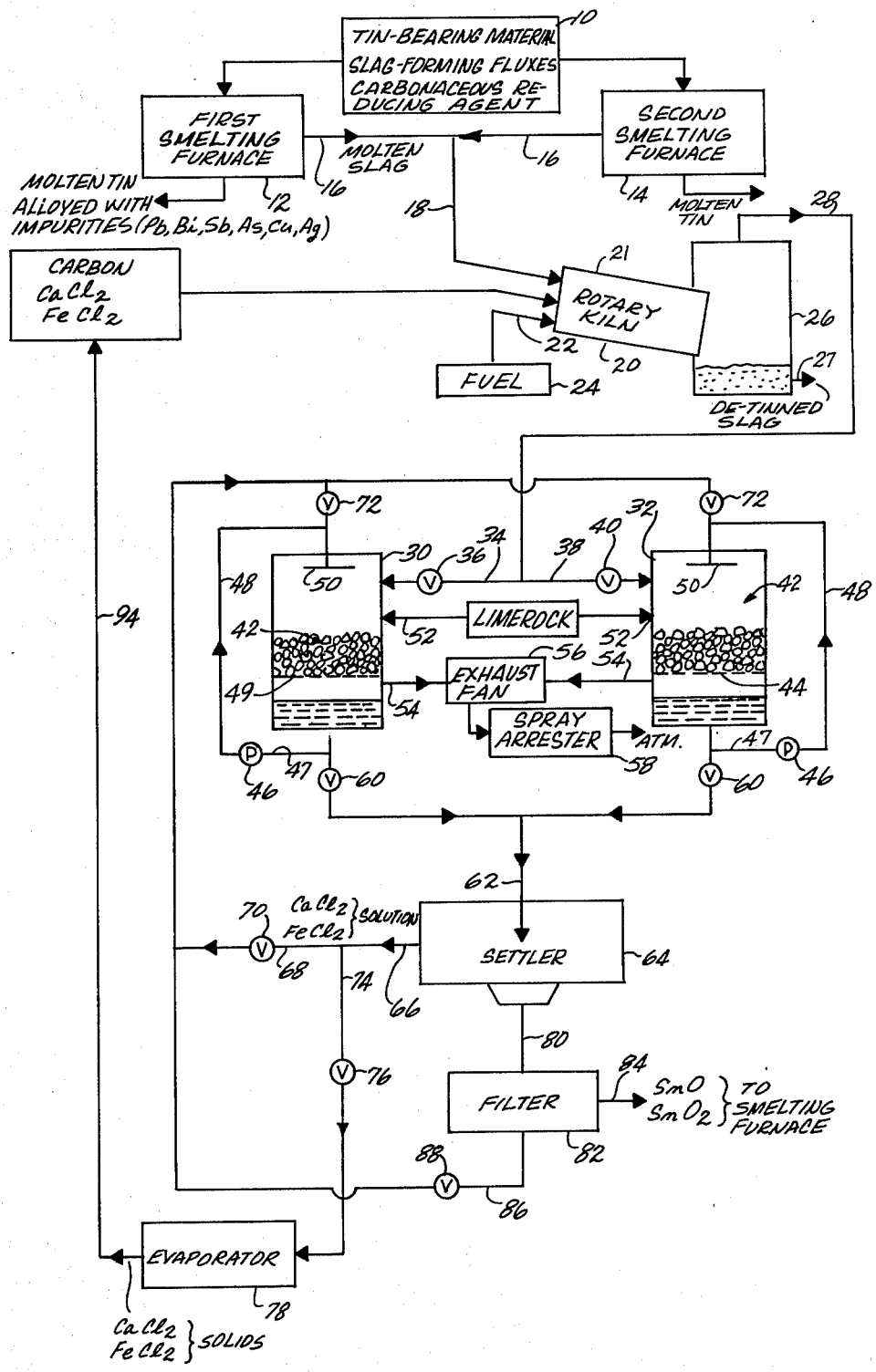

TIN RECOVERY

BACKGROUND OF THE INVENTION

1. Field of the Invention

This invention relates to the smelting of tin-bearing materials, and in particular to the production of a tin-bearing gas which is separated from molten slag.

2. Description of the Prior Art

Conventional treatment of tin-bearing materials usually involves two stages. The first includes mixing tin ore or concentrate with slag-forming fluxes (such as limestone and sand) and a reducing agent (such as carbon). The mixture also sometimes includes various by-products, such as fume or dust, dross, and hardhead, which is an alloy of tin and iron, typically containing less than 60% iron because of the relatively high melting point of tin-iron alloys of higher iron content.

The mixture is fed to a smelting furnace, usually a reverberatory furnace, and is smelted to produce liquid metallic tin and a molten silicate slag. This stage of the treatment is subject to the physico-chemical equilibrium between metallic tin and metallic iron dissolved in that tin, on the one hand, and the lower oxides of tin and iron (SnO and FeO, respectively) mixed with other oxides, including silica in the slag, on the other hand. This equilibrium demands that if the iron content of the metallic tin is to be controlled at a reasonable level, typically 1% iron by weight or less, then the tin and iron content of the slag shall be approximately equal. Since the ultimate outlet for the iron is in the slag, the iron content of the slag must be equal to that of the raw material smelted, plus that of the hardhead added to the charge, and since the slag must have a tin content approximately equal to the iron content of the slag (hereinafter referred to as "rich slag"), the slag will typically contain between 8% and 30% tin by weight.

After the smelting furnace charge has been heated to the required temperature to smelt the mixture and produce a lower layer of molten tin metal (plus certain metal impurities which may be present) and a top layer of molten rich slag, the contents of the smelting furnace are tapped out through a siphon or similar device to separate the molten tin metal from the rich slag. The stream of slag is either allowed to freeze on a flat surface so it can be subsequently broken up, or the stream of slag is granulated by a powerful jet of water.

This concludes the first stage of the conventional treatment, which is followed by a second-stage treatment to recover the tin in the rich slag, which is either in the form of dry lumps that must be crushed to suitable size, or else is in the form of wet granulated material of the desired size, and must be dried.

The properly conditioned rich slag is mixed with fluxes and carbon and is charged to a furnace where it is smelted to form hardhead and a second slag (hereinafter referred to as "poor slag").

The high melting point of hardhead precludes the use of a siphon or similar device for the separation of hardhead from the poor slag. Accordingly, separation of the molten hardhead and poor slag must be effected by decantation from open vessels. This process is laborious and inefficient, because some poor slag must be left with the hardhead to prevent loss of hardhead when the poor slag is discarded.

The hardhead must be granulated by a water jet, because it cannot economically be reduced to a suitable size with a crusher. The metallurgical requirement at this stage is that the poor slag shall contain a weight of iron equal to that in the concentrates and other new material (not by-products) fed to the first stage of the recovery operation.

The physico-chemical equilibrium requires that the tin content of the poor slag be about one-tenth of the iron content. If the iron content is so high that the tin content is unacceptably high, a third stage of treatment may be required.

The conventional two-stage process just described has five principal disadvantages.

1. The tin content of the poor slag, which is the waste product of the process, must contain a tin content approximately equal to one-tenth of the iron content of the raw materials smelted.

2. The tin which is recovered from the rich slag is in the form of hardhead and, therefore, is accompanied by an approximately equal weight of iron, which must be absorbed in the next bath of rich slag which is produced. The absorption of this cycling load of iron into the rich slag may raise the iron content to a level which is highly corrosive to the refractory lining of the smelting furnace. Moreover, since it is necessary that the tin content of the rich slag be approximately equal to the iron content, the resulting tin content of the rich slag places a heavy burden of metallurgical work on the second stage of the process.

3. To avoid loss of the hardhead which contains the tin recovered from the rich slag, it is necessary to return some poor slag with the hardhead. The return of this waste to the circuit increases the waste material content of the raw material being processed.

4. The combined effects of the three foregoing disadvantages limits the effective application of the conventional two-stage process to the treatment of raw materials having a tin content in excess of 50% and an iron content less than 5%.

5. The rich slag must be tapped out of the smelting furnace, solidified, and then be sized (by breaking up lumps of solidified slag) or be discharged as a stream of molten slag in a powerful jet of water to produce granulated slag, so the slag can be adequately mixed with the necessary fluxes and carbon for return to the smelting furnace. These operations cause not only the loss of the heat content of the liquid slag, but also incur additional handling costs for the solidified slag.

The above disadvantages all stem from the attempt to recover the tin by means of a liquid-liquid separation (liquid tin alloy-liquid slag). The disadvantages may be overcome if the tin is recovered by using a gas-liquid or gas-solid separation process involving one or more of the volatile tin compounds, such as stannous oxide, stannous sulfide, or stannous chloride.

Many patents have issued describing various gas-liquid or gas-solid processes for separating tin from iron-bearing materials.

British Pat. No. 1,332,726 discloses a process in which the tin-bearing material is melted and raised to the very high temperature of at least 1500° C. in an electric furnace to volatilize stannous oxide. The volatilization is aided by blowing air across the surface of the melt, which is kept quiescent to minimize the attack of the hot melt on the lining of the container. This process has a high energy consumption due to the temperatures at which the reaction is carried out. Moreover, the rate of volatilization of stannous oxide is slow because of the quiescent state of the molten slag.

The separation of tin in the form of stannous sulfide is accomplished by the well-known "fuming" process in which a sulfur-bearing substance, usually iron pyrites, is added to a liquid slag bath, which is both heated and stirred by oil or coal burners submerged below the surface of the molten slag.

The fuming process was developed for the recovery of tin from poor slags containing typically 3% tin by weight, but it can be, and has been, employed for the recovery of tin from rich slags.

The kinetics of the reaction between tin in a slag and a metallic sulfide dispersed or dissolved in the slag appear to be of the first order, i.e., the rate at which volatile tin compounds are formed depends only on the tin content of the slag undergoing treatment. Thus, the recovery of tin from poor slags is slow, and the fuming process must be operated as a batch process. Moreover, it may be necessary to install a heated holding furnace for the accumulation of slag awaiting treatment.

When the fuming process is employed for the treatment of rich slags, the evolution of tin-bearing fume in the early part of the batch treatment is intense. Accordingly, very large gas filtration equipment must be installed to avoid losses of tin fume. The scale of this filtration equipment greatly exceeds the capacity required during the latter part of the batch operation when the tin content of the slag under treatment reaches the level of a typical poor slag. Thus, a high capital investment is involved for gas filtration equipment far in excess of the capacity which would be required if the fume evolution were at a constant rate.

British Pat. No. 1,337,270 discloses a method which tries to overcome the disadvantages of the batch treatment by feeding finely-ground slag, together with pyrite fuel and air, into a cyclone furnace operated at about 1350° C. to achieve a steady volatilization of stannous sulfide at a uniform rate. But to operate this process in conjunction with the conventional production of liquid-rich slag, the slag must be tapped from the furnace and frozen, thereby sacrificing its heat content. Extra work is also entailed in grinding the solidified slag to the required particle size of less than 3 mm.

A disadvantage of all processes relying on the generation of stannous sulfide is that the entire sulfur content of the materials used is converted to sulfur dioxide, which accompanies the volatile tin compounds in the furnace off-gases, but is not trapped by the gas filtration equipment which collects the tin oxide.

The escape of the sulfur dioxide is an environmental hazard, and the installation of scrubbing plants for the removal of the sulfur dioxide from the off-gas is expensive. Furthermore, the operation of scrubbing plants is costly, and the sulfur-bearing products from such plants may be highly acidic sludges which require special disposal to avoid pollution of water sources.

Processes relying on the volatilization of stannous chloride have been described in a number of patents. For example, Netherlands Pat. No. 2,062 (1919) discloses the use of sodium chloride to form volatile stannous chloride, calcium chloride is disclosed in U.S. Pat. No. 1,931,944 (1934), and zinc chloride and ferrous chloride are disclosed in U.S. Pat. No. 1,843,060 (1932).

More recent patents have referred to the need to recover and reuse the reagents and have paid particular attention to the use of calcium chloride. For example, in British Pat. No. 1,095,122, a pelletized mixture of tin-bearing material with calcium chloride and coke is roasted in a closed retort to form stannous chloride, which is condensed in the cold end of the retort. The stannous chloride is then heated with lime and carbon to form metallic tin and calcium chloride, which may be used again to treat new tin-bearing material.

In Japanese Pat. No. 21,415 (1969), a mixture of tin-bearing material with calcium chloride is heated in a retort at about 980° C., and the resulting gases are passed through cold water to dissolve the chlorides of tin, iron, and other metals. The solution is partially neutralized to remove impurities. The iron content is reduced to the ferrous state, and tin oxide is precipitated by adjusting the pH of the solution to between 3 and 4.

French Pat. No. 2,010,021, British Pat. No. 1,266,711, and Canadian Pat. No. 907,865 (all by the same inventors), propose that a mixture of tin-bearing material and calcium chloride be pelletized and treated in the presence of coal at about 900° C. to 1050° C. in a rotary kiln heated by shell burners. The patents state that for a satisfactory kiln process, one must not exceed the sintering temperature of the charge. The issuing gases are passed through a scrubber, and the solution is neutralized with chalk or milk of lime in a step-wise manner to precipitate sequentially impurities, such as arsenic, antimony, and lead, then tin oxide, and finally iron and zinc hydroxides. Each of the three fractions is filtered off before the next neutralization step, and the final clean solution of the calcium chloride is evaporated for reuse. The patents state that in the preferred embodiment, the solution fed to the scrubber is maintained in a highly acid condition to avoid premature precipitation of stannous hydroxide or stannous oxychloride.

The foregoing prior art processes relating to gas-solid separation have in common the need for sophisticated methods of charge preparation, such as pelletizing or briquetting, and also for the careful control of charge temperature in the treatment furnace to prevent sintering of the mass, which must be kept as close as practical to the sintering temperature to achieve a reasonable rate of evaporation of stannous chloride from the solid mass. Thus, the temperature must be carefully controlled so it does not vary more than about 25° C. Even when this is done, the rate of production of volatile stannous chloride gases is relatively slow.

SUMMARY OF THE INVENTION

We recover tin from a tin-bearing molten silicate slag by mixing the molten slag with calcium chloride and a carbonaceous reducing agent to produce volatile tin chloride compounds rapidly, and without having to solidify the slag, size it, and form pellets or briquettes. The production of stannous chloride and its separation from the molten slag is more than twice as fast as the prior art processes in which stannous chloride gas is separated from solid slag so that the process of this invention can be carried out on a continuous basis in a simple, direct-fired rotary kiln in which the principal restraint is that the temperature be maintained above the melting point of the slag (about 1150° C.). Preferably, the atmosphere in the kiln is near neutral, i.e., neither strongly reducing nor oxidizing.

The direct-fired rotary kiln which can be used in practicing the process of this invention has no need for shell burners or other complicated devices, such as are required in the process described in Canadian Pat. No. 907,865. We have also discovered that when the direct-fired rotary kiln is heated, chlorinated hydrocarbon waste products may be added to the fuel supplied to the burner to enhance the rate of evolution of stannous chloride, and to reduce the consumption of metallic chloride reagents added to the molten slag.

We have also made the unexpected discovery that the hot chloride-bearing gas issuing from the kiln may be quickly and efficiently stripped of its chloride content by passing the hot gas into a scrubbing tower packed with lump limerock (a form of hard calcium carbonate) and irrigated with a copious supply of hot solution of various metallic chlorides at a pH between 1 and 5. This treatment instantly neutralizes the free acid and hydrolyzes the chlorides of tin, but not the ferrous or other chlorides, to form a slurry of stannous and stannic oxides suspended in a solution containing principally the chlorides of calcium and ferrous iron. The slurry is passed to a thickener to settle out the suspended oxides of tin while the clear overflow is divided between return to the scrubbing tower and treatment for the recovery of a mixture of calcium chloride and ferrous chloride solids, which may be reused in the treatment of further quantities of molten slag.

When the primary tin-bearing raw material to be treated in accordance with this invention consists of preconcentrates or residue from ore dressing operations, such raw material is melted in any suitable melting device, such as a smelting furnace, together with the fluxes and carbonaceous reducing agents needed to form a molten silicate slag at a reasonable temperature and with the correct oxygen potential so the iron content of the slag is in the ferrous state, and the tin content is in the stannous state to facilitate the following reactions:

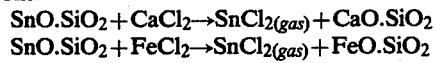

$SnO.SiO_2 + CaCl_2 \rightarrow SnCl_{2(gas)} + CaO.SiO_2$
$SnO.SiO_2 + FeCl_2 \rightarrow SnCl_{2(gas)} + FeO.SiO_2$ The preparation of the charge for the volatilization operation in accordance with this invention is thus reduced to the single operation of smelting, which is more simple and less expensive than the elaborate processes of grinding, sizing, mixing, pelletizing or briquetting, and final careful drying, which are required in the prior art processes for recovering tin by volatilization of stannous chloride from solid slag.

In the preferred process of this invention, the preliminary slag-making step provides an automatic removal of base metal impurities, such as lead, bismuth, antimony, arsenic, copper, and silver, because these impurities form a metallic alloy with a little tin, leaving a clean slag. The tin alloyed with the metal impurities is tapped out of the slag-making smeltering furnace at intervals and is treated for the recovery of its component elements by known means, such as the highly efficient process of electrolysis in alkaline electrolyte, to yield a very pure tin cathode and an anode residue which may be smelted to crude lead bullion for the recovery of other values.

If desired, the sulfur and arsenic content of a tin-bearing raw material may be reduced to low levels, either by sulfide flotation or by calcining the raw material under oxidizing conditions, all as is well understood by those skilled in the art, as normal preliminary operations to be carried out before the smelting or melting of the raw material.

BRIEF DESCRIPTION OF THE DRAWING

The accompanying drawing is a flow sheet showing the presently-preferred embodiments of the invention.

DESCRIPTION OF THE PREFERRED EMBODIMENTS

Referring to the drawing, a mixture of tin-bearing material, slag-forming fluxes, and a carbonaceous reducing agent are supplied from a conventional mixer 10 to first and second smelting furnaces 12 and 14, respectively, which may be operated simultaneously to provide a relatively steady flow of molten slag as explained below.

The tin-bearing material can be any suitable raw material, such as preconcentrates of ore, ore concentrate, fume or dust, dross, hardhead, tin-rich slag, or any residue from tin-processing operations, or any mixture of such material. The slag-forming fluxing material is normally a mixture of limestone and sand. The reducing agent is used in an amount adequate to ensure the existence of the iron and tin in the stannous and ferrous states, respectively. It can be almost any form of carbon, such as coke, charcoal, anthracite, and the like.

The smelting furnaces heat the mixture fed to them to a temperature sufficient to form a molten slag and to permit a major portion of the tin to be reduced to the elemental state so it separates as a liquid metallic phase from the molten silicate slag. The removal of such metal normally removes a major portion of the tin originally present in the tin-bearing material, and also base metal impurities, such as lead, bismuth, antimony, arsenic, copper, and silver, which alloy with the molten tin.

The smelting furnace can be of any convenient type, such as a conventional reverberatory furnace, from which it is possible to obtain a controlled, steady flow of molten slag. If a separate liquid metallic phase is formed by the smelting of the mixture, then that metallic phase is separated from the slag flow by a conventional metal siphon or similar device (not shown).

In the usual case, where the process of the present invention is applied as the second stage in the smelting of tin concentrates, it is convenient, but not essential, to use two reverberatory furnaces. Each of the furnaces is connected by a respective heated slag launder 16 to a common drop chute 18 feeding into a rotating rotary kiln 20, which provides the volatilization step described below. The flow of molten slag into the heated slag launders is controlled by separate conventional slag-tapping notches (not shown) in each of the smelting furnaces. Thus, while the first furnace provides a steady flow of slag to the volatilization operation in the kiln, the second smelts a charge of tin concentrates to form a rich slag and molten tin metal, which will be tapped out, leaving the second furnace holding a charge of rich slag ready for the volatilization operation. When the first smelting furnace has been drained of rich slag, the slag notch on that furnace is closed, and the first furnace is charged with tin concentrates. Meanwhile, a flow of rich slag to the volatilization operation is drawn from the second furnace.

A controlled weight of mixed calcium chloride and ferrous chloride, both in the solid state, and a controlled weight of carbon are added at the inlet end of the rotary kiln to a controlled flow of molten slag provided by the slag-making operation. The temperature of the slag is kept above its melting point from the time it leaves a smelting furnace until it is discharged as a poor slag from the process. A convenient, but not exclusive, form of apparatus for providing the volatilization step is a conventional rotating refractory-lined tube kiln 21 slightly inclined downwardly from the inlet to the outlet end of the kiln. A burner 22 is at the inlet end of the kiln and is supplied fuel from a source 24. A second burner (not shown) can also be used at the discharge end of the kiln if necessary to keep the slag in a fluid state. The fuel can be any suitable material, such as natural gas or fuel oil. We have found it advantageous to supplement the fuel with any chlorinated hydrocarbon to enhance the volatilization of the tin in the molten slag.

The inlet end of the kiln has a rotating seal bearing (not shown) on a closing plate (not shown) which is fitted with entry ports for the slag feed drop chute, the oil burner or other source of heat, the controlled addition of a solid mixture of calcium chloride and ferrous chloride, and the controlled addition of carbon.

As the molten slag flows into the rotary kiln, it is joined by a measured amount of carbon and chloride salts, such as calcium and ferrous chloride. The fluid state of the molten slag and the rotation of the rotary kiln ensures fast and thorough mixing of the ingredients, which results in an almost explosive reaction between the chloride salts and the tin compounds in the molten slag to produce volatile tin and iron chloride compounds, which separate rapidly from the molten slag as it tumbles and moves down through the kiln.

Molten slag and volatile tin and iron compounds flow out the outlet end of the kiln into a chamber 26 built of refractory brick. The floor of the chamber is below the level of the kiln outlet, and there is a slag notch 27 in any convenient wall of the chamber at floor level for discharge of molten, treated (de-tinned) poor slag. A flue 28, constructed from refractory brick, conducts the chloride-laden gas from the brick chamber to either a first scrubber 30 or a second scrubber 32.

Gas enters the upper end of the first scrubber through a line 34 and a control valve 36. Gas can enter the second scrubber through a line 38 and a control valve 40. In each scrubber a bed of lumps of limerock 42 rests on a grate 44 mounted across the lower portion of the scrubber and spaced above the bottom to leave a space for the collection of a hot solution of calcium chloride and ferrous chloride, which is circulated through the scrubber by a separate respective pump 46 having its inlet side connected to one end of a line 47, the other end of which is connected to the bottom of the scrubber. A line 48 has its lower end connected to the discharge of pump 46 and its upper end connected to a series of spray nozzles 50, which spray hot solution into the chamber and on the bed of limerock lumps.

In the gas scrubbing operation, the hot chloride-laden gas from the volatilization operation encounters a copious spray of the solution of calcium chloride and ferrous chloride at a temperature of about 90° C. The gas and solution move downwardly together over the column of limerock lumps. The tin and iron chloride components of the gas are stripped and absorbed in the solution. The remainder of the gas is now ready for discharge to the atmosphere. The stannous and ferrous chlorides transferred from the gas to the solution react rapidly with the water to form stannous and ferrous hydroxide and hydrochloric acid. The hydrochloric acid reacts with the limestone to form water, carbon dioxide, and calcium chloride to produce a suspension of stannous and stannic oxide in solution of calcium and ferrous chloride having a pH of about 4.

A convenient, but not exclusive, form of a scrubbing tower is a rectangular or square shaft of acid-resistant brick with the sprayer 50 in the roof of the shaft. The lines 34 and 38 carrying the hot chloride-laden gas enter a respective scrubber below the sprayer. Lump limerock is fed as needed into each scrubber through a port 52 located in each scrubber just below the point of gas entry. The size of the limerock lumps fed into the scrubber is conveniently in the range between 2 and 3 inches. The column of limerock in each scrubber is supported by the grid 44 having about 1" spacing and located at a level far enough above the bottom of each scrubber to accommodate a gas outlet duct 54 through which the scrubbed gas is drawn by an exhaust fan 56 having its discharge connected to a spray arrestor 58 so that substantially dry gas is vented to the atmosphere. The slurry of stannous and stannic oxides is removed from the bottom of each scrubber through a control valve 60 and fed through a line 62 into a settler 64, which may be of conventional type.

It is convenient, but not essential, to install two scrubbing towers as just described to provide standby equipment in case of blockage of the limerock column by an accumulation of insoluble material, and also to provide additional capacity to adjust the pH of the slurry by pumping the slurry through the standby scrubbing tower without admitting the entry of gas to that tower. Once the solution circulated through the standby scrubber is of the desired pH, it is blended with the solution circulated through the active scrubber.

The slurry of stannous and stannic oxides in the solution of calcium chloride and ferrous chloride at a pH of about 4 settles in the settler to separate a thicker slurry of stannous and stannic oxides from a clean overflow solution of calcium and ferrous chloride, which is delivered from the settler through an effluent line 66. A major portion of the effluent from the settler is circulated through a line 68 and control valve 70 back to the sprayers in the scrubbers through control valves 72.

A minor portion of the effluent from the settler flows through line 74 and control valve 76 to an evaporator-crystallizer 78, to produce solid calcium chloride dihydrate and anhydrous ferrous chloride that are returned by a conveyor 94 to the inlet end of the rotary kiln for reuse.

The thickened slurry of stannous and stannic oxides is passed from the bottom of the settler through a sludge line 80 to a filter 82, where the slurry is washed with clean water to deliver a de-watered chloride-free mixture of stannous and stannic oxides through a discharge line 84, and a dilute solution of calcium chloride and ferrous chloride through line 86 and control valve 88 back to the sprayers in the scrubbing towers.

The de-watered chloride-free mixture of stannous and stannic oxides contains almost the entire tin content of the slag which entered the volatilization operation. The mixture of stannous and stannic oxides is now either converted to metallic tin by smelting in a conventional manner, or, in the specific case where the process of this invention is applied as a second stage in the smelting of tin concentrates, the mixture of stannous and stannic may be returned to the slag-making operation as a component of the smelting furnace charge.

Although the preferred embodiment of the invention is a continuous process, the invention can also be practiced in a batch process. For example, the slag can be formed in a rotary smelting furnace, and the calcium chloride, ferrous chloride, and carbon added after the molten tin (if any) is removed, and while the bath is agitated by rotating the smelting furnace. After the tin in the molten slag reacts to form volatile tin chlorides, which are removed and treated as described above, the poor slag is dumped from the rotary kiln, and the process repeated.

Whether using the continuous or batch embodiment of the process of this invention, the same surprising results are obtained, namely fast reaction of the chloride salts with the tin compounds in the molten slag to produce a volatile tin chloride gas which rapidly separates from the molten slag. For example, in treating a silicate slag in accordance with our process, tin chlorides are formed and separated from the molten slag two to four times faster than tin can be recovered in the prior art processes. Thus, not only does our process recover tin rapidly without pelletizing or briquetting the starting material, but the speed with which the reaction takes place permits the volatilization equipment to be efficiently utilized, so large quantities of tin are recovered in a given piece of volatilization equipment before that equipment must be serviced or replaced.

We claim:
1. Removing tin from a tin-bearing material by:
   (a) heating the material in the presence of slag-forming fluxing agents and a carbonaceous reducing agent to form a molten slag from which some of the tin separates as molten metal;
   (b) separating the molten tin metal from the molten slag;
   (c) thereafter adding carbon and a chloride-containing material to the molten slag to cause the tin remaining in the slag to form a volatile tin chloride compound; and
   (d) stirring the molten slag in the presence of the chloride-containing material to release the volatile tin compound from the molten slag.
2. A method according to claim 1 which includes the step of stirring the molten slag in a direct-fired rotary kiln in the presence of the chloride-containing material.
3. A method according to claim 1 or 2 which includes the step of contacting the volatile tin chloride compound with a solution of calcium chloride trickling over a bed of limestone to form a tin compound insoluble in the solution.
4. Removing tin from a tin-bearing silicate slag by:
   (a) heating the slag above its melting point to form molten slag;
   (b) mixing the molten slag with carbon and a chloride-containing compound to form a volatile tin chloride compound; and
   (c) stirring the molten slag in the presence of the chloride-containing compound to release the volatile tin chloride compound from the molten slag.
5. A method according to claim 1 which includes the step of stirring the molten slag in a direct-fired rotary kiln in the presence of the chloride-containing compound to release the volatile tin compound.
6. The method according to claims 1 or 4 in which the chloride-compound is calcium chloride.
7. A method according to claims 1 or 4 in which the chloride-containing compound is a mixture of calcium chloride and ferrous chloride.
8. A method according to claims 1 or 4 in which the chloride-containing compound is between about 5% and about 20% by weight of the molten slag.
9. A method according to claims 1 or 4 in which the carbon is present in the amount between about 1% and about 5% by weight of the molten slag.
10. A method according to claims 1 or 4 which includes the step of absorbing the volatile tin chloride in a solution of calcium chloride.
11. A method according to claim 10 in which the solution includes ferrous chloride.
12. A method according to claim 10 in which the pH of the solution is between about 1 and about 5.
13. A method according to claim 10 in which the temperature of the solution is at least 90° C.
14. A method according to claim 10 in which the solution is in contact with lumps of limerock.
15. A method according to claim 10 which includes the step of separating the solid tin compounds from the solution, and thereafter evaporating the solution to form a solid chloride-containing compound.
16. A method according to claim 4 in which the ambient atmosphere during the mixing step is substantially neutral.
17. A method according to claims 1 or 4 which includes the step of burning a chlorinated hydrocarbon in the rotary kiln during the stirring step.

* * * * *